United States Patent [19]

Saha et al.

[11] Patent Number: 5,051,030
[45] Date of Patent: Sep. 24, 1991

[54] CHEMICAL DETOXIFICATION PROCESS FOR TREATMENT OF SOILS CONTAMINATED WITH HALOGENATED ORGANIC COMPOUNDS

[75] Inventors: Anuj K. Saha, Marlton, N.J.; Amitava Sarkar, Downingtown, Pa.

[73] Assignee: Roy F. Weston, Inc., West Chester, Pa.

[21] Appl. No.: 533,467

[22] Filed: Jun. 5, 1990

[51] Int. Cl.$^5$ .................... A62D 3/00; B01J 8/00
[52] U.S. Cl. .................... 405/128; 210/757; 210/763; 210/908; 208/262.1; 208/262.5; 423/488; 423/DIG. 20
[58] Field of Search ............... 405/128, 129; 210/757, 210/763, 908; 423/481, 488, 659, DIG. 20; 208/262.1, 262.5

[56] References Cited

U.S. PATENT DOCUMENTS

| | | | |
|---|---|---|---|
| 3,595,931 | 7/1971 | Hay et al. | 208/262.5 X |
| 4,144,152 | 3/1979 | Kitchens | 204/157.93 X |
| 4,319,060 | 3/1982 | Cunningham et al. | 570/134 |
| 4,387,246 | 6/1983 | Disdier et al. | 564/417 |
| 4,410,737 | 10/1983 | Cordier | 568/774 |
| 4,410,738 | 10/1983 | Cordier | 568/774 |
| 4,410,739 | 10/1983 | Cordier et al. | 568/774 |
| 4,418,213 | 11/1983 | Cordier et al. | 564/412 |
| 4,469,661 | 9/1984 | Shultz | 423/210.5 |
| 4,495,368 | 1/1985 | Cordier | 564/412 |
| 4,532,350 | 7/1985 | Cordier et al. | 564/412 |
| 4,540,834 | 9/1985 | Cordier | 568/774 |
| 4,632,742 | 12/1988 | Tundo | 204/158.21 |
| 4,647,700 | 3/1987 | Cordier | 564/412 |
| 4,659,443 | 4/1987 | Byker | 204/131 |
| 4,749,817 | 6/1988 | George et al. | 570/204 |
| 4,810,365 | 3/1989 | Dohler et al. | 208/262.1 |
| 4,839,042 | 6/1989 | Tumiatti et al. | 210/194 |
| 4,869,825 | 9/1989 | Steiner | 210/634 |

Primary Examiner—Dennis L. Taylor
Assistant Examiner—John Ricci
Attorney, Agent, or Firm—Austin R. Miller

[57] ABSTRACT

A method of detoxifying a component of contaminated soil containing a halogenated organic compound including contacting the contaminated soil with atomic hydrogen in an amount effective to react with halogen contained in the compound and substituting the hydrogen for the halogen.

20 Claims, 1 Drawing Sheet

5,051,030

CHEMICAL DETOXIFICATION PROCESS FOR TREATMENT OF SOILS CONTAMINATED WITH HALOGENATED ORGANIC COMPOUNDS

FIELD OF THE INVENTION

This invention relates to a method of decontaminating soil, particularly to a method of detoxifying halogenated organic compounds contained in soil.

BACKGROUND OF THE INVENTION

Water insoluble, nonvolatile, halogenated organic pollutants such as polychlorobiphenyls (PCB's), chlorinated pesticides, halogenated BNA's and the like are principle hazardous constituents at many Superfund sites and in many uncontrolled industrial waste sites. These pollutants are often found in soils and sediments and require detoxification as a result of government regulations or because of increasing environmental awareness of their high toxicity. At ambient temperature, most chlorinated pesticides and PCB's are in the solid phase, whereas halogenated BNA's are typically in the liquid phase. The solubilities of these compounds in water are low, even at elevated temperatures. Low solubilities result in great difficulties when attempting to decontaminate soils containing these troublesome compounds.

Effective detoxification of soils contaminated with toxic nonvolatile halogenated organics has prove to be an intractable and persistent problem in the past and pose major challenges to Superfund, industrial and other cleanup efforts. Available detoxification technologies are plagued with high treatment costs, rigorous reaction conditions, poor kinetics and low conversion efficiencies.

For example, incineration of contaminants in soil often produces acceptable detoxification efficiency for some nonvolatile halogenated organics, but requires a very high temperature to achieve 99.99+ percent conversion needed to decontaminate soils to environmentally acceptable levels. This occurs because the reaction equilibrium constants for halogens such as chlorine hydrogenation depend on reaction temperatures. At lower temperatures, equilibrium favors the reverse reaction shown as follows:

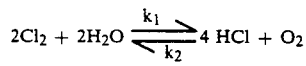

$$2Cl_2 + 2H_2O \underset{k_2}{\overset{k_1}{\rightleftharpoons}} 4\,HCl + O_2$$

K values at various temperatures for the above reaction can be tabulated as follows:

| t (°F.) | K | Comment |
|---|---|---|
| 1,600 | 0.6 | Reverse reaction favored |
| 2,191 | 6.5 | Forward reaction favored |
| 2,800 | 14.0 | Forward reaction heavily dominating |

From the above Table it is evident that incineration temperatures of up to and over 2,800° F. are required to achieve a very high K value, which translates into high conversion/destruction efficiency. However, maintaining such extremely high temperatures in available incinerator apparatus is cost prohibitive.

Other chemical detoxification technologies for soil treatment generally use corrosive and hazardous chemicals in rigorous reaction conditions and typically also required expensive organic solvents to solubilize the contaminants, thereby compounding the cleanup task. The hazards and wear and tear associated with these detoxification technologies are much higher, and generally the kinetics of conversion are slower, thereby severely reducing their practical application.

OBJECTS OF THE INVENTION

It is an object of the present invention to provide a soil detoxification process that does not use corrosive or environmentally hazardous chemicals to achieve high efficiency cleanup of contaminated soils.

It is another object of the present invention to provide a soil detoxification process which does not require hazardous and/or cost prohibitive rigorous reaction conditions.

It is a further object of the present invention to provide a soil detoxification process which improves reaction kinetics and increases conversion efficiency.

SUMMARY OF THE INVENTION

This invention provides a chemical detoxification process to remediate soils contaminated with halogenated pesticides, BNAs and the like. The process uses zinc and a mild acid such as acetic acid to generate nascent or atomic hydrogen, which replaces aliphatic and aromatic halogen atoms in toxic organics in the presence of heat and a catalyst. The halogenated toxic organics are converted to nontoxic hydrodehalogenated compounds.

DETAILED DESCRIPTION OF THE INVENTION

Figure 1:
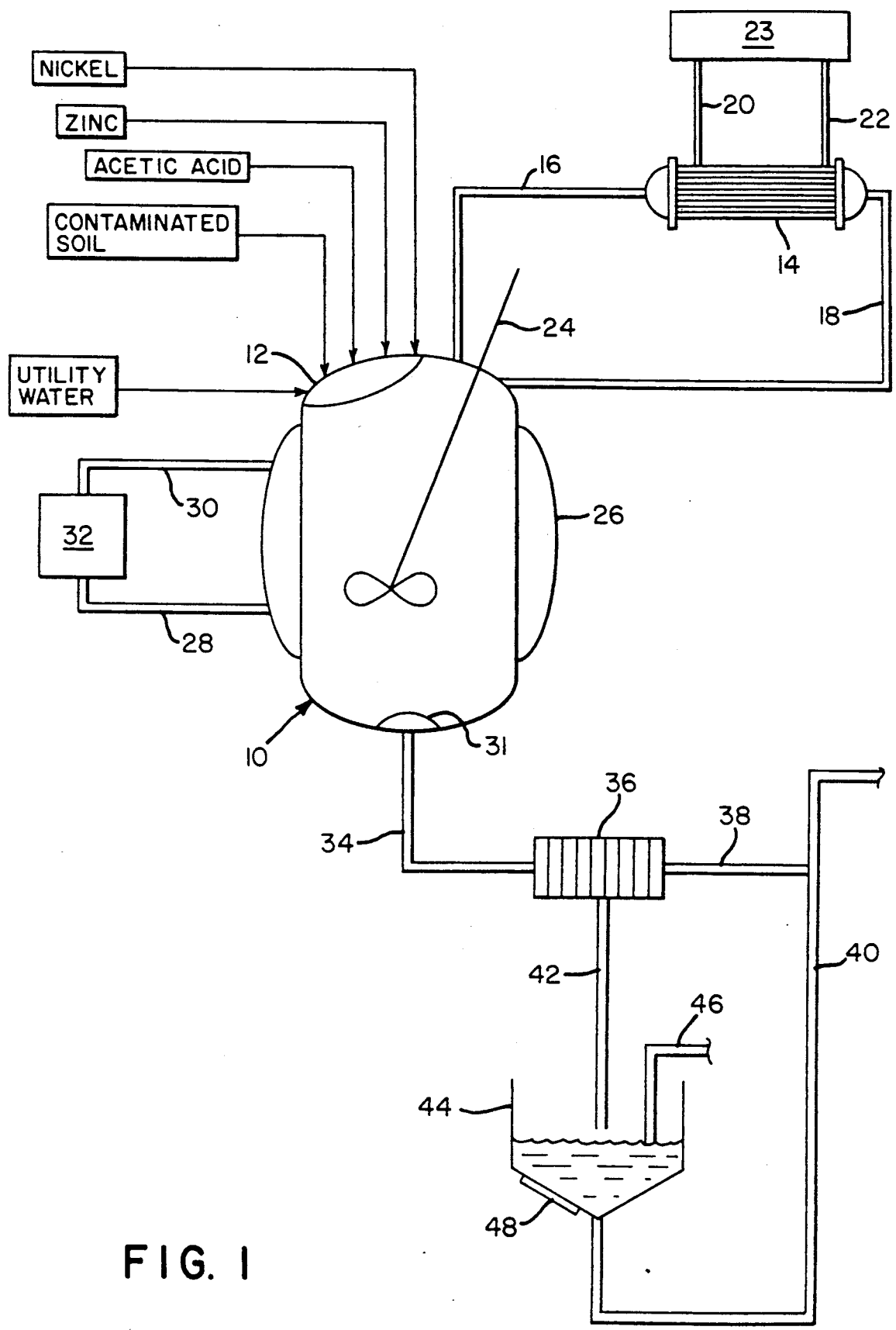
FIG. 1 is a schematic of one preferred form of apparatus used to practice a preferred form of the process of the invention.

It will be appreciated that the following description is intended to refer to certain specific aspects of the invention selected for illustration in the drawings and is not intended to define or to limit the invention, other than in the appended claims.

Referring now to FIG. 1, remediation of soils contaminated with a wide range of aromatic and aliphatic halogenated nonvolatile organics such as DDT, PCB, hexachlorobenzene and the like can be accomplished for the first time with a novel chemical detoxification process hereinafter referred to as nascent state hydrodehalogenation or NSH. NSH includes a chemical process wherein halogen atoms bonded to a contaminant compound are replaced with nascent (atomic) hydrogen atoms. Replacement of halogen atoms from the organics removes the toxicity generating constituent from the contaminant. Nascent hydrogen is generated in the process of the invention by the chemical reaction between zinc and a dilute organic acid. Nascent state hydrodehalogenation performed in accordance with the invention has been effectively applied to remediate contaminated soil in treatment processes.

It h as bee n discovered that nascent state hydrodehalogenation detoxifies halogenated nonvolatile organics such as DDT and its metabolites (DDD and DDEt), hexachlorobenzene, various polychlorobiphenyls such as PCB 1221 and the like as shown by the chemical reactions illustrated below.

The detoxification method of the invention may be applied to a wide variety of halogenated aliphatic and aromatic compounds, a illustrative list of which appears below: hexachlorobenzene
dichlorodiphenyltrichloroethane (DDT)
dichlorodiphenylethane (DDEt)
1, 2, 4, 5, 6, 7, 8-8 octachloro 2, 3, 3a, 4, 7, 7a-hexahydro - 4, 7 - methano -1H - indene (Chlordane)
6, 7, 8, 9, 10, 10 -hexachloro - 1, 5, 5a, 6, 9, 9a - hexahydro-6, 9 methano 2, 4, 3 benzodioxathiepin 3 oxide (Endosulfan)
1, 2, 3, 4, 10, 10 - hexachloro - 6, 7 - epoxy - 1, 4, 4a, 5, 6, 7, 8, 8a - octa hydroendo, endo - 1, 4:5, 8 dimethanonaphthalene (Endrin
1, 2, 3, 4, 10, 10 - hexachloro - 1, 4, 4a, 5, 8, 8a - hexahydro - 1, 4,:5, 8 - dimethanonaphthalene (Aldrin)
3, 4, 5, 6, 9, 9 - hexachloro - 1a, 2, 2a, 3, 6, 6a, 7, 7a- octahydro 2, 7:3, 6 dimethanonaphthalene [2-3-6]oxirene (Dieldrin)
PCB 1016, PCB 1232, PCB 1242, PCB 1248, PCB 1254, PCB 1260, trichlorophenol, - BHC, - BHC, - BHC, - BHC
1, 2, 3, 4, 10, 10 - hexachloro - 6, 7 - epoxy - 1, 4, 4a, 5, 6, 7, 8, 8a octahydro endo, exo 1, 4:5, 8-dimethanonaphthalene
dichloro diphenyl dichloro ethane (DDD)
trichlorobenzene
pentachlorophenol
PCB 1221

A variety of acids may be used in the reaction, including acetic, formic, citric, tartaric and the like. Acetic acid is preferred for practical and cost reasons. Organic acids, such as those listed above are highly efficient in generating controlled amounts of nascent (atomic) hydrogen. Surprisingly, we found that mineral acids such as hydrochloric, sulfuric and the like do not provide a controllable quantity of nascent hydrogen for reaction as do organic acids. The reasons for this phenomenon are not fully understood. Apparently, mineral acids react so quickly with the zinc that they provide a burst of nascent hydrogen at a rate far in excess of the rate of the hydrodehalogenation reaction. The result is that the rapidly but only briefly generated hydrogen escapes from the reaction mixture before it can participate in the hydrodehalogenation reaction, which proceeds at a far lower rate.

It is also possible to use catalysts other than Ni for enhancing nascent hydrogen production. Other catalysts include, but are not limited to, cobalt, molybdenum, yttrium, iridium and the like. It is still further possible to use metals other than zinc for nascent hydrogen production, although zinc is highly preferred Other metals include, for example, those in Group II b.

One especially preferred form of practicing the invention in a batch mode for soil treatment detoxification is shown in FIG. 1. Reactor vessel 10, having hatch 12 or any other conventional access opening, is sized to receive contaminated soil and other reactants. Condenser 14 connects to reactor 10 by vapor conduit 16 and condensate conduit 18. Condenser 14 utilizes a cooling fluid, such as water, received from inlet 20. Spent cooling fluid exits condenser 14 through outlet 22, which connects to fluid cooler 23. Fluid cooler 23 may be of any conventional type.

Contaminated soil and other reactants are mixed with mixer 24, which may be of any type well known in the art. Mixer 24 is powered by conventional powering means (not shown) known in the art. Reactor 10 is heated by heating jacket 26, which receives heating fluid, such as steam, water, oil, dowtherm or the like from fluid inlet 28. Spent heating fluid exits jacket 26 at fluid outlet 30, which connects to heater 32. Heater 32 may be of any conventional fluid heating type capable of transferring heat to reactor 10.

Treated soils and reactants exit reactor 10 through gateway 31 and into conduit 34, which connects to filter 36. Filtrate is remove from filter 36 through filtrate conduit 38 and waste conduit 40. Treated soil exits filter 36 by soil conduit 42 and enters soil washer 44. Cleaning water is added through water pipe 46 from a water source (not shown) and wash water exits soil washer 44 through waste conduit 40. Treated and cleaned soil exits soil washer through door 48 or any other suitable soil removing means.

In the method of the invention, contaminated soil is introduced into the reactor vessel and then mixed with powdered technical grade zinc, a technical grade dilute organic acid, such as acetic acid, a suitable catalyst, such as a nickel catalyst and water. The soil mixture is then heated in the reactor. Heat applied to the reactor in conjunction with the catalyst causes the zinc and organic acid to react as illustrated in reaction "i"

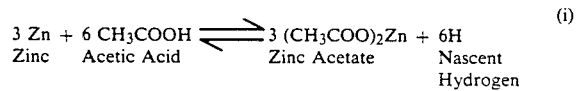

(i)
3 Zn + 6 CH₃COOH ⇌ 3 (CH₃COO)₂Zn + 6H
Zinc   Acetic Acid        Zinc Acetate    Nascent Hydrogen The reaction results in production of nascent or atomic hydrogen. The nascent hydrogen is produced in such quantity that it is available to attack the toxic compound halogen substituents. Halogen substituents on the toxic organic compounds are removed and substituted with atomic hydrogen, thereby forming a dehalogenated, non-toxic compound. Representative reactions of this process are listed below in reactions ii) through v).

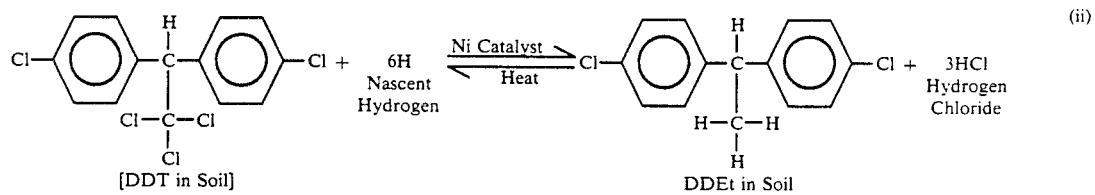

(ii)

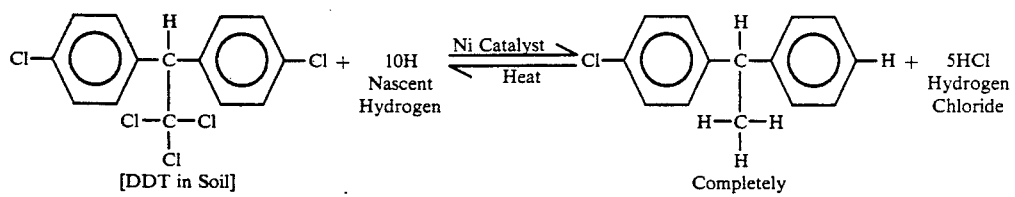

(iii)

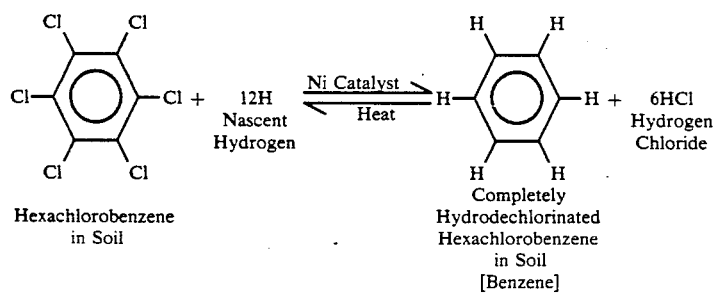

(iv)

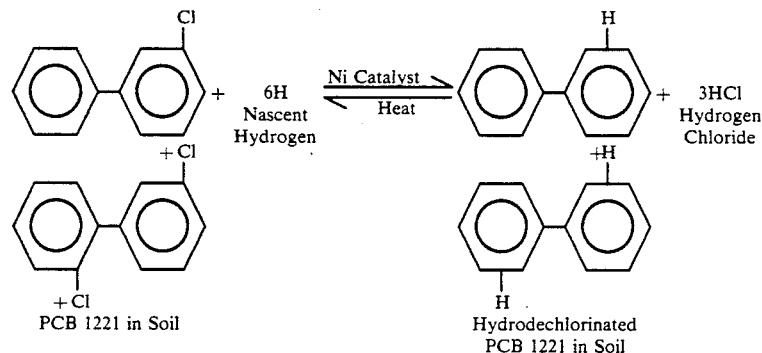

(v)

It is important in the invention that the hydrogen generated in the reaction vessel be nascent or atomic hydrogen. It has surprisingly been discovered that molecular hydrogen namely $H_2$, does not result in substitution of hydrogen for halogen substituents. This is apparently due to the excellent and unexpected reducing power associated with the hydrogen atoms. Accordingly, we have discovered that hydrogen should be generated in situ, in the reaction mixture, so that reaction between the newly formed, atomic hydrogen and the toxic organic compounds can occur.

Although the subject toxic organic compounds typically have very low solubilities, it has been found that other organic solvents, typically necessary to place the toxic organic compounds into solution, are not necessary. Surprisingly, water may be used in place of the normal organic solvents heretofore thought to be necessary.

Reactor 10 preferably has a jacket 26 construction to receive heat from external heat source 32, although other heating means known in the art may be used. The heating medium is preferably low pressure steam or "dowtherm" type heating fluid to achieve steady and even heating of the reactor contents. Reactor 10 may optionally be fitted with condenser 14 to condense vapors exiting reactor 10. Condensate formed from condensed vapors may be continuously refluxed back to reactor 10 if desired or directly disposed of.

The heated reaction mixture typically generates vapor at elevated temperatures. These vapors consist primarily of water, but may also include a small amount of hydrochloric and/or hydrofluoric acid vapor or low boiling point organics. Condensing the vapors and refluxing the condensate to the reaction mixture avoids the trouble of providing an extra set of washing apparatus.

Treated soil at the completion of the reaction is removed from the reactor through conduit 34, filtered in a manner known in the art, such as through filter 36, and washed with water in soil washer 44 before reclamation. The remaining filtrate is disposed of in a conventional manner.

The hydrodehalogenation reaction to detoxify the contaminated soil is preferably completed in 4 to 8 hours, most preferably about 6 hours, depending on the amount of soil to be treated to the make up of the soil and the type of contaminant(s). Hydrodehalogenated compounds formed during the reaction remain in the liquid phase and are separated from the soil during washing.

The reaction has been effectively carried out in a temperature range of about 75° C. to about 130° C., preferably from about 75° C. to about 95° C. The acid should preferably be added after first heating the soil/catalyst/water slurry to an elevated temperature of 75° C. to 80° C. Also, it has been determined that the reactants, namely the nickel, catalyst and acid should be added to the reactor in stoichiometric amounts.

Also, it has been found to be advantageous to add at least two times the theoretical stoichiometric amount of reactants or more to the reaction mixture. Due to the typically low yields of the chemical reaction and the heterogeneous nature of the soils to be treated, at least two times the theoretical stoichiometric amount of reactants should be added to ensure the desired degree of detoxification of toxic compounds contained in the contaminated soil. The lack of uniformity of contaminated soils, which frequently contain various soil types such as clay, sand, loam and the like, rocks, sticks and other debris, garbage and other foreign materials, some or all of which are capable of altering reaction pathways, does not retard the ability of the process of the invention to achieve environmentally acceptable levels of soil detoxification.

EXAMPLES

The following experiments demonstrate that nascent state hydrodehalogenation effectively detoxifies soils contaminated with halogenated organic compounds such as DDT, DDD, DDE, hexachlorobenzene and the like.

Table 1 shows test conditions for detoxification of soil samples contaminated with DDT and hexachlorobenzene. The initial DDT and hexachlorobenzene concentrations in the soil were 3,500 mg/kg (ppm) and 150 mg/kg (ppm), respectively.

Table 2 shows analytical results for the tests. The soil after treatment was filtered to separate the liquid phase and both the filtrate and the treated soil were analyzed for DDT and its metabolites, namely DDD and DDEt. The treated soil for Test No. 2 was also analyzed for hexachlorobenzene.

The results indicate the following percentage reduction for DDT and hexachlorobenzene in treated soil:

TABLE 1

| | Nascent State Hydrodehalogenation Test Conditions | | | | | | |
|---|---|---|---|---|---|---|---|
| Test No. | Soil[a] (g) | Zinc (g) | Catalyst (mg) | Acid (ml) | DI H$_2$O (ml) | Mixing/ Reaction Time[b] (min) | Avg. Temp[c] (°C.) |
| 1 | 200 | 5.00 | 170 Ni | 120 ml/ 17.4 normal acetic acid | 300 | 490 | 85 |
| 2 | 200 | 5.00 | 170 Ni | 118 ml/ 17.4 normal acetic acid | 300 | 400 | 95 |

[a]Rounded off to the nearest gram.
[b]Approximated to the nearest 10-minute interval.
[c]Arithmetic average of the temperature readings taken periodically during the test.

TABLE 2

| | Analytical Data Summary for Nascent State Hydrodechlorination Tests | | | | | | |
|---|---|---|---|---|---|---|---|
| | | | Concentration of Analytes after Treatment (Soil mg/kg; Liquid ug/L) | | | | |
| Test No. | Sample Description | Matrix | DDT | DDD | DDE | DDEt | Hexachloro- benzene |
| 1 | Filtrate | Water/ acetic acid | 28[JB] | 320 | ND | 5,000 | |
| 1 | Treated Soil | Soil | ND | 47 | ND | 640 | |
| 2 | Filtrate | Water/ acetic acid | 660 | 30[J] | ND | 17,300 | |
| 2 | Treated Soil | Soil | 0.049 | 2.5 | ND | 330 | 1.3[J] |

[B]Present in the blank.
[J]Present below quantification limit (the tabulated number is the quantification number).

| Test # | % Reduction of DDT | % Reduction of Hexachlorobenzene |
|---|---|---|
| 1 | $\frac{3500 - 0}{3500} \times 100 = 100\%$ | |
| 2 | $\frac{3500 - 0.049}{3500} \times 100 = 99.99\%$ | $\frac{150 - 1.3}{150} \times 100 = 99.13\%$ |

The above tests demonstrate that nascent state hydrodehalogenation effectively remediates soil containing water insoluble, halogenated, nonvolatile toxic organics.

Although this invention has been described and illustrated as being effective to detoxify particular halogenated organic compounds for the sake of convenience, the scope of this invention as defined in the appended claims is fully intended to include toxic halogenated organic compounds to specifically listed herein. Also, although certain apparatus has been described and illustrated herein to effectively detoxify components of contaminated soil, it should be understood that other suitable apparatus may be substituted without departing from the scope of the invention defined in the appended claims. For example, reactor vessel 10 may be utilized in any number of configurations, including conveyor means to transport contaminated soil directly into the reactor. Similarly, alternative condensers 23, heaters 32, filters 36, washers 44 and the like may be employed.

We claim:

1. A method of detoxifying a component of contaminated soil containing a halogenated organic compound comprising contacting said contaminated soil with atomic hydrogen in an amount effective to react with halogen contained in said compound and reacting the hydrogen with the halogenated organic compound to substitute said hydrogen for said halogen.

2. The method defined in claim 1 further comprising contacting said contaminated soil with a catalyst.

3. The method defined in claim 2 wherein said catalyst is selected from the group consisting of nickel, cobalt, molybdenum, yttrium and iridium.

4. The method defined in claim 1 further comprising reacting elemental zinc and an organic acid to produce said atomic hydrogen.

5. The method defined in claim 4 wherein said acid is selected from the group consisting of acetic, formic, citric and tartaric.

6. The method defined in claim 1 further comprising heating said contaminated soil to a temperature between about 75°0 C. and about 130° C.

7. The method defined in claim 1 further comprising capturing vapors formed during said contacting and substituting steps, condensing said vapors to form a condensate, and contacting said condensate with said contaminated soil.

8. The method defined in claim 1 further comprising filtering and washing said soil after detoxification of said organic compound.

9. The method defined in claim 1 wherein said atomic hydrogen is contacted with said contaminated soil for between about 4 hours and about 8 hours.

10. A method of detoxifying a component of contaminated soil containing an organic compound having a halogenated substituent comprising contacting said contaminated soil with atomic hydrogen in an amount effective to react with halogen contained in said substituent and reacting the hydrogen with the halogenated substituent to substitute said hydrogen for said halogen.

11. The method defined in claim 10 further comprising contacting said contaminated soil with a catalyst.

12. The method defined in claim 11 wherein said catalyst is selected from the group consisting of nickel, cobalt, molybdenum, yttrium and iridium.

13. The method defined in claim 10 further comprising reacting elemental zinc and an acid to produce said atomic hydrogen.

14. The method defined in claim 13 wherein said acid is selected from the group consisting of acetic, formic, citric and tartaric.

15. The method defined in claim 10 wherein said contacting step includes mixing together elemental zinc, an acid that is reactive with said elemental zinc to produce nascent hydrogen, elemental nickel catalyst, water and said contaminated soil in a reactor.

16. The method defined in claim 10 further comprising heating said contaminated soil to a temperature between about 75° C. and about 130° C.

17. The method defined in claim 10 further comprising filtering and washing said soil after detoxification of said organic compound.

18. The method defined in claim 10 wherein said atomic hydrogen is contacted with said contaminated soil for between about 4 hours and about 8 hours.

19. A method of detoxifying a component of contaminated soil containing a halogenated organic compound comprising contacting said contaminated soil with atomic hydrogen in an amount effective to react with halogen contained in said compound and substituting said hydrogen for said halogen, said contacting step including mixing together elemental zinc, acid that is reactive with said elemental zinc to produce nascent hydrogen, elemental nickel catalyst, water and said contaminated soil in a reactor.

20. A method of detoxifying a component of contaminated soil containing an organic compound having a halogenated substituent comprising contacting said contaminated soil with atomic hydrogen in an amount effective to react with halogen contained in said substituent and substituting said hydrogen for said halogen, said contacting step including mixing together elemental zinc, acid that is reactive with said elemental zinc to produce nascent hydrogen, elemental nickel catalyst, water and said contaminated soil in a reactor.

* * * * *